United States Patent
Song

(10) Patent No.: US 10,560,554 B2
(45) Date of Patent: Feb. 11, 2020

(54) IN-SITU OAM SAMPLING AND DATA VALIDATION

(71) Applicant: Futurewei Technologies, Inc., Plano, TX (US)

(72) Inventor: Haoyu Song, San Jose, CA (US)

(73) Assignee: Futurewei Technologies, Inc., Plano, TX (US)

( * ) Notice: Subject to any disclaimer, the term of this patent is extended or adjusted under 35 U.S.C. 154(b) by 93 days.

(21) Appl. No.: 15/972,770

(22) Filed: May 7, 2018

(65) Prior Publication Data

US 2018/0331933 A1    Nov. 15, 2018

Related U.S. Application Data

(60) Provisional application No. 62/505,664, filed on May 12, 2017.

(51) Int. Cl.
| | |
|---|---|
| *H04L 29/06* | (2006.01) |
| *H04L 29/08* | (2006.01) |
| *H04L 12/26* | (2006.01) |
| *H04L 12/741* | (2013.01) |
| *H04L 12/24* | (2006.01) |

(52) U.S. Cl.
CPC .......... *H04L 69/22* (2013.01); *H04L 29/0653* (2013.01); *H04L 29/0863* (2013.01); *H04L 41/0273* (2013.01); *H04L 43/10* (2013.01); *H04L 45/745* (2013.01); *H04L 67/147* (2013.01); *H04L 2212/00* (2013.01)

(58) Field of Classification Search
CPC .......... H04L 29/06102; H04L 29/0653; H04L 29/0863; H04L 69/22; H04L 67/147; H04L 69/161
See application file for complete search history.

(56) References Cited

U.S. PATENT DOCUMENTS

| | | | |
|---|---|---|---|
| 2017/0111209 A1* | 4/2017 | Ward | H04L 41/0631 |
| 2017/0250907 A1* | 8/2017 | Pignataro | H04L 45/74 |
| 2018/0278548 A1* | 9/2018 | Pignataro | H04L 69/22 |

* cited by examiner

*Primary Examiner* — Ashley Shivers
(74) *Attorney, Agent, or Firm* — Vierra Magen Marcus LLP

(57) ABSTRACT

The disclosure relates to technology for sending network management information in a network. A source edge node modifies data packets by encapsulating an operations, administration and maintenance (OAM) header in a select number of the data packets. The OAM header includes a data type bitmap and a node data list. A valid node bitmap is inserted into the OAM header prior to the node data list, and each bit in the valid node bitmap identifies whether one or more nodes in the network add data to the OAM header. A valid data bitmap is then added into the OAM header for each of the one or more nodes identified as adding data to the OAM header. The valid data bitmap indicates types of data items available at the node. Subsequently, the edge node issues the select data packets to the one or more nodes identified in the OAM header.

20 Claims, 8 Drawing Sheets

US 10,560,554 B2

IN-SITU OAM SAMPLING AND DATA VALIDATION

CLAIM OF PRIORITY

This application claims the benefit of priory to U.S. Provisional Appl. No. 62/505,664, filed May 12, 2017, the content of which are hereby incorporated by reference.

FIELD

The disclosure generally relates to communication networks and, more particularly, to Operation, Administration and Maintenance (OAM) domains and an OAM frame format.

BACKGROUND

Data communication networks may include various computers, servers, nodes, routers, switches, bridges, hubs, proxies, and other network devices (generically referred to as network elements) coupled together and configured to pass data to one another. Data is communicated through the data communication network by passing protocol data units, such as frames, packets, cells, or segments, between the network elements. The various network elements on the communication network communicate with each other using protocols. Different protocols are used to administer different parts of the communication, such as instructing the network elements how to route information.

As networking technology has evolved, Ethernet has become an increasingly important technology across various segments of networks, including local area networks (LANs), metropolitan area networks (MANs), and wide-area networks MANS). However, Ethernet does not allow certain OAM operations to occur, thereby limiting the ability to manage and diagnose problems on the network. In some instances, the lack of OAM support in Ethernet prevents the network provider from taking measurements to perform fault detection, isolation, confirmation, and many other operations that a network provider or subscriber may wish to be able to do on the network.

BRIEF SUMMARY

According to one aspect of the present disclosure, there is provided a method of sending network management information in a network, including modifying, by a source edge node, data packets by encapsulating an operations, administration and maintenance (OAM) header in a select number of the data packets, wherein the OAM header includes a data type bitmap; inserting a valid node bitmap into the OAM header, by the source edge node, wherein each bit in the valid node bitmap identifies whether one or more nodes in the network add data to the OAM header; adding a valid data bitmap into the OAM header, by the source edge node, for each of the one or more nodes identified as adding data to the OAM header, wherein the valid data bitmap indicates types of data items available at the node; and issuing, by the source edge node, the select data packets to the one or more nodes identified in the OAM header.

Optionally, in any of the preceding aspects, the number of the data packets are selected periodically.

Optionally, in any of the preceding aspects, a percentage of the number of data packets are selected randomly.

Optionally, in any of the preceding aspects, each bit in the valid data bitmap corresponds to a valid bit in the data type bitmap.

Optionally, in any of the preceding aspects, the OAM header includes one or more data node lists and the valid data bitmap is inserted before node data in a corresponding one of the data node lists.

Optionally, in any of the preceding aspects, a number of bits in the valid data bitmap is equal to a number of types of data in the data type bitmap.

Optionally, in any of the preceding aspects, the method further includes forming a data array including the one or more node data lists each corresponding to a valid bit in the valid data bitmap.

Optionally, in any of the preceding aspects, the data type bitmap defines the types of data to be collected at the one or more nodes in the network.

Optionally, in any of the preceding aspects, each bit in the valid node bitmap corresponds to a hop on a data packet forwarding path of the network and is listed in an order of the hops on the data packet forwarding path.

Optionally, in any of the preceding aspects, the OAM header includes one or more node data lists and the valid node bitmap is inserted into the OAM header before the one or more node data lists.

According to one other aspect of the present disclosure, there is provided a node sending network management information in a network, including a non-transitory memory storage comprising instructions; and one or more processors in communication with the memory, wherein the one or more processors execute the instructions to: modify data packets by encapsulating an operations, administration and maintenance (OAM) header in a select number of the data packets, wherein the OAM header includes a data type bitmap; insert a valid node bitmap into the OAM header, wherein each bit in the valid node bitmap identifies whether one or more nodes in the network add data to the OAM header; adding a valid data bitmap into the OAM header for each of the one or more nodes identified as adding data to the OAM header, wherein the valid data bitmap indicates types of data items available at the node; and issue the select data packets to the one or more nodes identified in the OAM header.

According to still one other aspect of the present disclosure, there is provided a non-transitory computer-readable medium storing computer instructions for sending network management information in a network, that when executed by one or more processors, cause the one or more processors to perform the steps of modifying, by a source edge node, data packets by encapsulating an operations, administration and maintenance (OAM) header in a select number of the data packets, wherein the OAM header includes a data type bitmap; inserting a valid node bitmap into the OAM header, by the source edge node, wherein each bit in the valid node bitmap identifies whether one or more nodes in the network add data to the OAM header; adding a valid data bitmap into the OAM header, by the source edge node, for each of the one or more nodes identified as adding data to the OAM header, wherein the valid data bitmap indicates types of data items available at the node; and issuing, by the source edge node, the select data packets to the one or more nodes identified in the OAM header.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

The present disclosure will now be described with reference to the figures, which in general relate to communication networks and, more particularly, to Operation, Administration and Maintenance (OAM) domains and an OAM frame format.

In-situ OAM (IOAM) data is added to a packet upon entering the IOAM domain and is removed from the data packet when exiting the IOAM domain. IOAM data fields are added to or removed from traffic (i.e., data packets traversing the network) by the nodes (or elements) which form the edge of a domain (e.g., source edge node or router). Within the IOAM domain, the OAM data may be updated by network elements that the data packet traversed. As data packets traverse the network, tracing data is collected at every node.

While it may be beneficial to collect data from each node for OAM applications, such information is often repetitive and redundant and may place a burden on the nodes, particularly where calculation is required at the node. Moreover, some nodes may not be able to provide the requested data.

In one embodiment, to reduce the node processing load, the source edge node can define either the period or the probability to add the IOAM header to the selected flow packet. In this way, a subset of the data packets carry the OAM data, which not only reduces the overall amount of IOAM data, but also reduces the processing work load of the network nodes.

In another embodiment, a node may be too busy to handle a data request or certain types of data are not available. In this case, a valid data bitmap can be attached to each node data to indicate whether the data is valid or invalid. Data that is designated as invalid will be ignored for processing purposes.

It is understood that the present embodiments of the disclosure may be implemented in many different forms and that claims scopes should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Figure 1A:
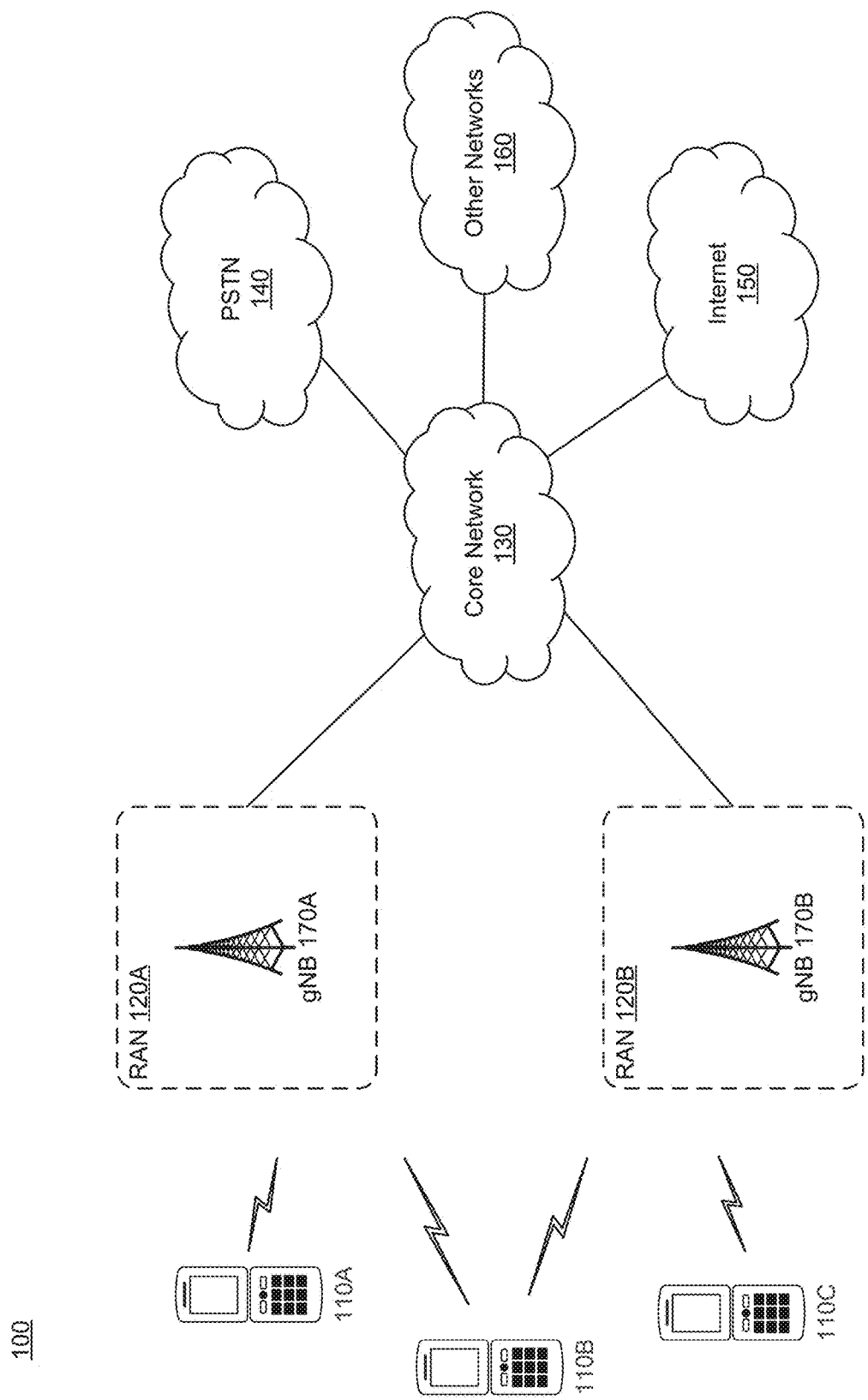
FIG. 1A illustrates a wireless network for communicating data.

FIG. 1A illustrates a wireless network for communicating data. The communication system 100 includes, for example, user equipment 110A-110C, radio access networks (RANs) 120A-120B, a core network 130, a public switched telephone network (PSTN) 140, the Internet 150, and other networks 160. Additional or alternative networks include private and public data-packet networks including corporate intranets. While certain numbers of these components or elements are shown in the figure, any number of these components or elements may be included in the system 100.

In one embodiment, the wireless network may be a fifth generation (5G) network including at least one 5G base station which employs orthogonal frequency-division multiplexing (OFDM) and/or non-OFDM and a transmission time interval (TTI) shorter than 1 ms (e.g. 100 or 200 microseconds), to communicate with the communication devices. In general, a base station may also be used to refer any of the eNB and the 5G BS (gNB). In addition, the network may further include a network server for processing information received from the communication devices via the at least one eNB or gNB.

System 100 enables multiple wireless users to transmit and receive data and other content. The system 100 may implement one or more channel access methods, such as but not limited to code division multiple access (CDMA), time division multiple access (TDMA), frequency division multiple access (FDMA), orthogonal FDMA (OFDMA), or single-carrier FDMA (SC-FDMA).

The user equipment (UE) 110A-110C are configured to operate and/or communicate in the system 100. For example, the user equipment 110A-110C are configured to transmit and/or receive wireless signals or wired signals. Each user equipment 110A-110C represents any suitable end user device and may include such devices (or may be referred to) as a user equipment/device, wireless transmit/receive unit (UE), mobile station, fixed or mobile subscriber unit, pager, cellular telephone, personal digital assistant (PDA), smartphone, laptop, computer, touchpad, wireless sensor, wearable devices or consumer electronics device.

In the depicted embodiment, the RANs 120A-120B include one or more base stations 170A, 170B (collectively, base stations 170), respectively. Each of the base stations 170 is configured to wirelessly interface with one or more of the UEs 110A, 110B, 110C to enable access to the core network 130, the PSTN 140, the Internet 150, and/or the other networks 160. For example, the base stations (BSs) 170 may include one or more of several well-known devices, such as a base transceiver station (BTS), a Node-B (NodeB), an evolved NodeB (eNB), a next (fifth) generation (5G) NodeB (gNB), a Home NodeB, a Home eNodeB, a site controller, an access point (AP), or a wireless router, or a server, router, switch, or other processing entity with a wired or wireless network.

In one embodiment, the base station 170A forms part of the RAN 120A, which may include other base stations, elements, and/or devices. Similarly, the base station 170B forms part of the RAN 120B, which may include other base stations, elements, and/or devices. Each of the base stations 170 operates to transmit and/or receive wireless signals within a particular geographic region or area, sometimes referred to as a "cell." In some embodiments, multiple-input multiple-output (MIMO) technology may be employed having multiple transceivers for each cell.

The base stations 170 communicate with one or more of the user equipment 110A-110C over one or more air interfaces (not shown) using wireless communication links. The air interfaces may utilize any suitable radio access technology.

It is contemplated that the system 100 may use multiple channel access functionality, including for example schemes in which the base stations 170 and user equipment 110A-110C are configured to implement the Long Term Evolution wireless communication standard (LTE), LTE Advanced (LTE-A), and/or LTE Multimedia Broadcast Multicast Service (MBMS). In other embodiments, the base stations 170 and user equipment 110A-110C are configured to implement UMTS, HSPA, or HSPA+ standards and protocols. Of course, other multiple access schemes and wireless protocols may be utilized.

The RANs 120A-120B are in communication with the core network 130 to provide the user equipment 110A-110C with voice, data, application, Voice over Internet Protocol (VoIP), or other services. As appreciated, the RANs 120A-120B and/or the core network 130 may be in direct or indirect communication with one or more other RANs (not shown). The core network 130 may also serve as a gateway access for other networks (such as PSTN 140, Internet 150, and other networks 160). In addition, some or all of the user equipment 110A-110C may include functionality for communicating with different wireless networks over different wireless links using different wireless technologies and/or protocols.

The RANs 120A-120B may also include millimeter and/or microwave access points (APs). The APs may be part of the base stations 170 or may be located remote from the base stations 170. The APs may include, but are not limited to, a connection point (an mmW CP) or a base station 170 capable of mmW communication (e.g., a mmW base station). The mmW APs may transmit and receive signals in a frequency range, for example, from 24 GHz to 100 GHz, but are not required to operate throughout this range. As used herein, the term base station is used to refer to a base station and/or a wireless access point.

Although FIG. 1A illustrates one example of a communication system, various changes may be made to FIG. 1A. For example, the communication system 100 could include any number of user equipment, base stations, networks, or other components in any suitable configuration. It is also appreciated that the term user equipment may refer to any type of wireless device communicating with a radio network node in a cellular or mobile communication system. Non-limiting examples of user equipment are a target device, device-to-device (D2D) user equipment, machine type user equipment or user equipment capable of machine-to-machine (M2M) communication, laptops, PDA, iPad, Tablet, mobile terminals, smart phones, laptop embedded equipped (LEE), laptop mounted equipment (LME) and USB dongles.

Figure 1B:
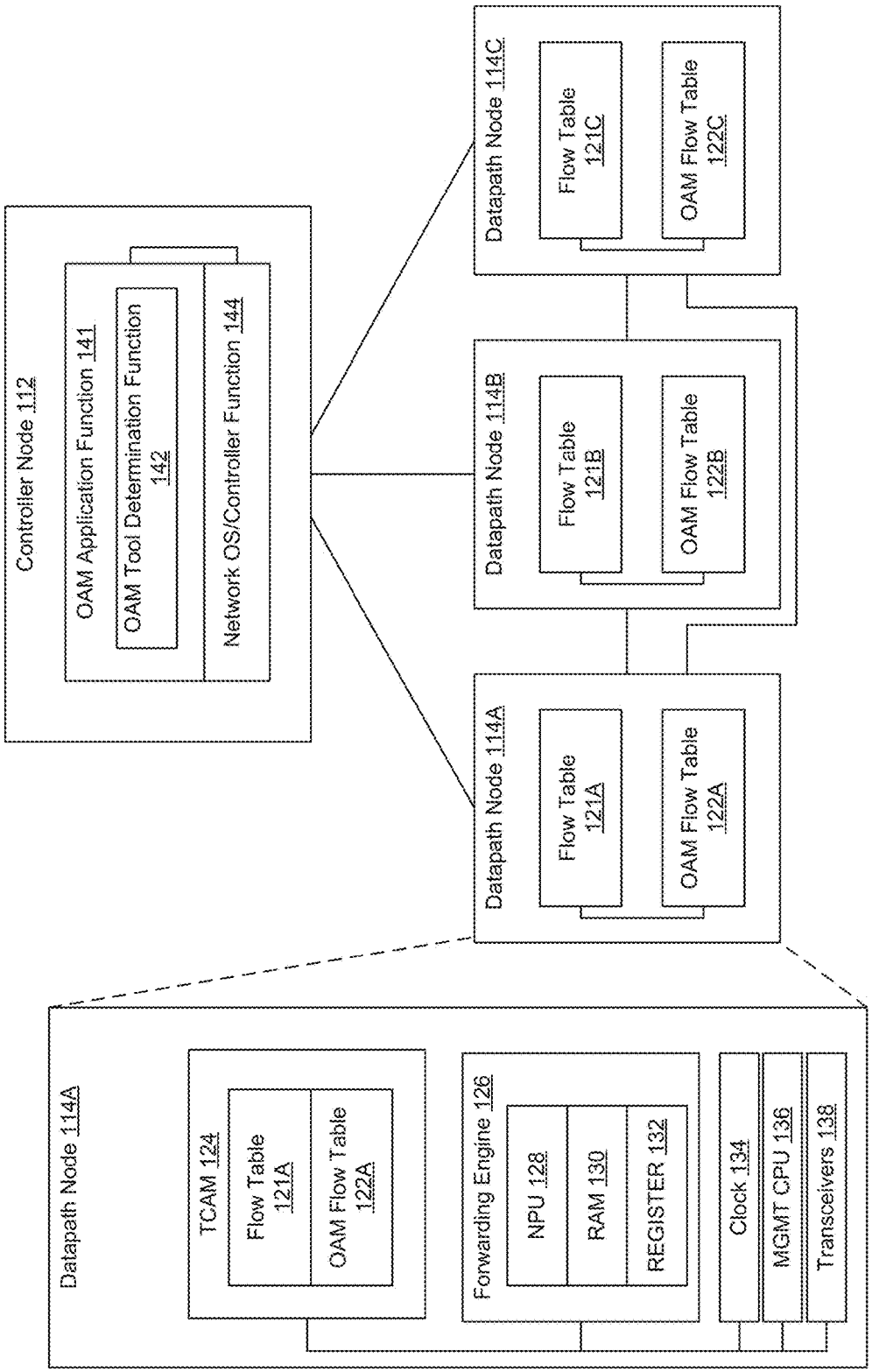
FIG. 1B illustrates an example communications system in accordance with the disclosed technology.

FIG. 1B illustrates an example network in which operations, administration and management functions may be implemented. Software defined networking (SDN) generally refers to any network where forwarding plane functionality (or data plane functionality) is implemented in a plurality of network nodes (or datapath nodes) under the control of control plane functionality that is implemented in a separate network node, such as a controller node. An example of an SDN architecture, or specification, is the OpenFlow Switch Specification, version 1.1.0 (hereinafter "OpenFlow Switch Specification"), available from the OpenFlow Switch Consortium. It is appreciated that OpenFlow Switch Specification is a non-limiting example and that any network in which forwarding plane functionality is separate from control plane functionality may be implemented.

An OAM function, as used herein, refers to any function(s) that may be implemented in conjunction with a flow in a network for purposes of OAM of the flow, or of the network in which the flow exists. Non-limiting examples of OAM functions include functions for proactive or on-demand fault management, such as continuity checks, loopbacks, and link traces; and functions for on-demand or proactive performance measurements, such as loss measurements, delay measurements, or throughput measurements. In the context of an Ethernet network, specific non-limiting examples of OAM functions include continuity checks for fault detection, loopback messages for fault verification, and multicast link trace messages for performing path discovery and fault isolations. Examples of Ethernet service performance measurement OAM functions include delay measurement and loss measurement. In the context of a Multiprotocol Label Switching (MPLS) network, non-limiting examples of OAM functions include label-switched path (LSP) ping functions for providing basic connectivity checks, which may be run periodically or on-demand, traceroute functionality, and loopback functionality. While specific example of OAM functions have been provided, the embodiments are not limited to the implementation of any particular OAM function, and may be used to implement any desired function with respect to the OAM of a flow, or of a network in which the flow exists.

As illustrated, the network 102 includes a controller node 112 and one or more datapath nodes 114A-114C. It is appreciated that while the network 102 may include multiple controller nodes 112 and numerous datapath nodes 114A-114C, for purposes of discussion one controller node 112 and three datapath nodes 114A-114C have been illustrated. Each of the datapath nodes 114A-114C is in communication with the controller node 112 via a communication link, as well as in communication with each other via communication links. The datapath nodes 114A-114C may include respective flow tables 121A-121C. The flow tables 121A-121C may maintain information about each flow handled by the respective datapath node 114A-114C. The term "flow" refers to a path of data packets through the network 102 communicated between a source node (not illustrated) and a destination node (not illustrated). Each datapath node 114A-114C may be associated with many flows, and typically processes such flows under the control of the controller node 112.

In one embodiment, each of the datapath nodes 114A-114C also includes an OAM structure such as an OAM flow table 122A-122C, each of which stores information regarding OAM functionality implemented by the respective datapath node 114A-114C in conjunction with a particular flow. Other elements of the datapath nodes 114A-114C may include a ternary content-addressable memory (TCAM) 124 in which the flow table 121A and the OAM flow table 122A are implemented. In one embodiment, the datapath node 114A also includes a forwarding engine 126 for handling the forwarding of packets associated with flows in accordance with the flow table 121A.

The forwarding engine 126 includes one or more network processing units (NPUs) 128, a random access memory (RAM) 130, which may be used, for example, to store software instructions associated with an OAM tool for implementing an OAM tool function in conjunction with a flow, and one or more registers 132. The datapath node 114A may also include a clock 134, which is used, for example, to generate timestamps associated with packets generated or processed by an OAM tool. A management central processing unit (CPU) 136 may be used for overall control and management of the datapath node 114A. The datapath node 114A may also include one or more transceivers 138 configured to communicate via the communication links.

The controller node 112 may include an OAM application function 141 which implements the OAM functionality described with respect to the controller node 112. The OAM application function 141 may include an OAM tool determination function 142 which determines OAM tools for communication to respective datapath nodes 114A-114C. A network operating system (OS) and controller function 144 may also be responsible for the overall functionality of the controller node 112 and communication with the datapath nodes 114A-114C.

Figure 2A:
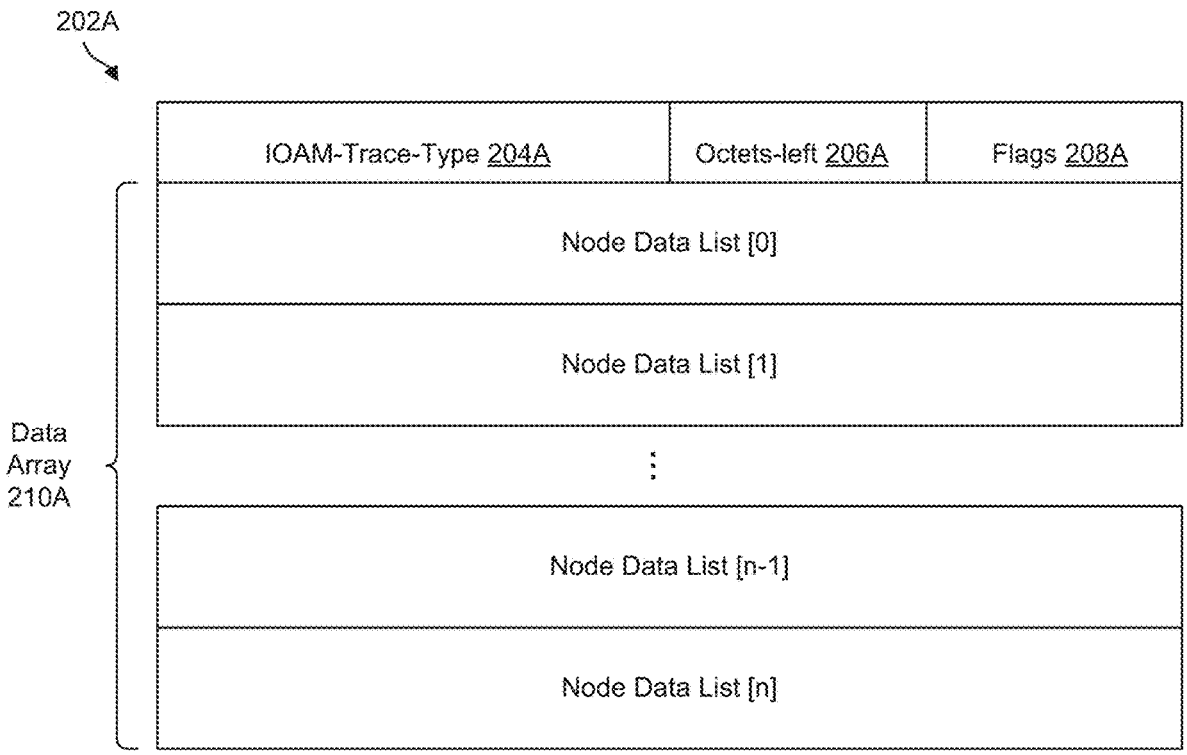
FIGS. 2A and 2B illustrate embodiments of data fields in OAM inserted into data packets.
Figure 2B:
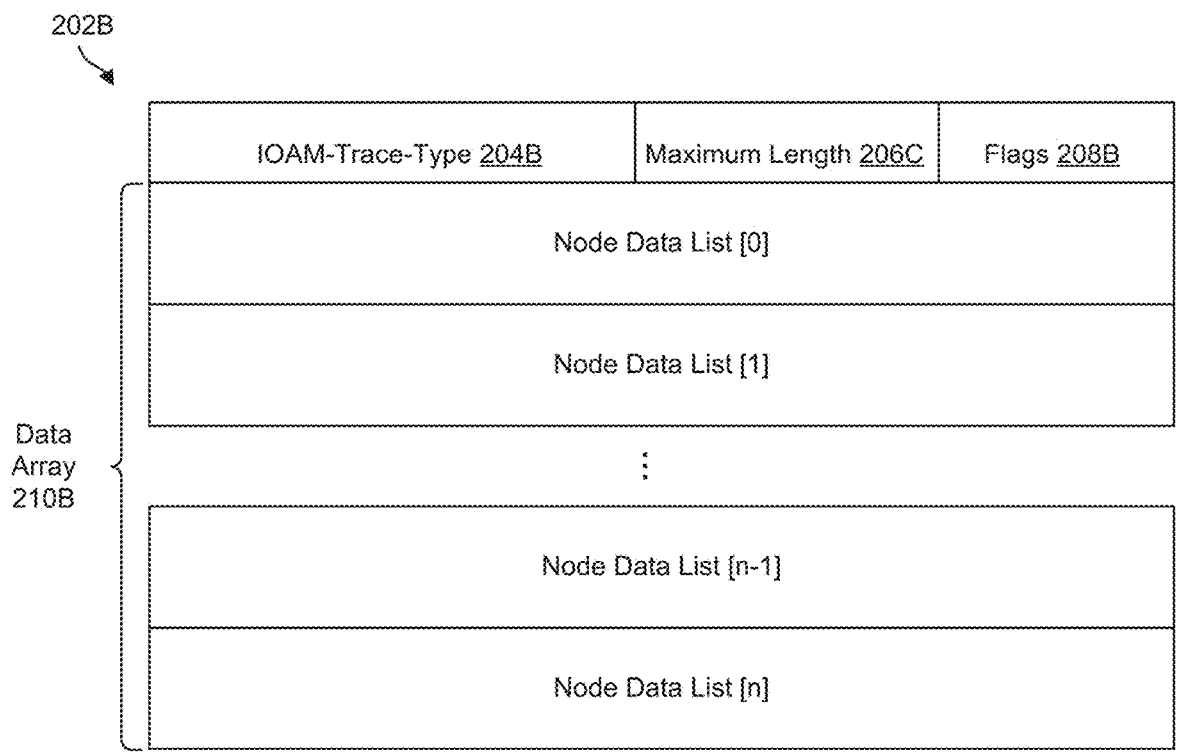

FIGS. 2A and 2B illustrate embodiments of data fields in OAM inserted into data packets. In particular, the data fields depicted in the drawings define "in-situ" OAM (IOAM), in which the IOAM records OAM information within a data packet of the network, while the packet traverses a particular network domain. In-situ generally refers to OAM data being added to the data packets in the network, as opposed to being propagated separately as an OAM packet. That is, the OAM data piggybacks on the data packets traversing the network. It is appreciated that the OAM data may be transported by a variety of transport protocols, including but not limited to, Network Services Headers (NSH), Segment Routing, Virtual Extensible Local Area Network-Generic Protocol Extension (VXLAN-GPE), Geneve, IPv6 or IPv4.

IOAM affords at least the following capabilities: (1) a flexible data format to allow different types of information to be captured as part of an in-situ OAM operation, including but not limited to path tracing information, operational and telemetry information such as timestamps, sequence numbers, or even generic data such as queue size, geolocation of the node that forwarded the packet, etc., (2) a data format to express node as well as link identifiers to record the path a packet takes with a fixed amount of added data, (3) the ability to determine whether any nodes were skipped while recording in-situ OAM information (i.e., in-situ OAM is not supported or not enabled on those nodes), (4) the ability to actively process information in the packet, for example to prove in a cryptographically secure way that a packet really took a pre-defined path using some traffic steering method such as service chaining or traffic engineering, (5) the ability to include OAM data beyond simple path information, such as timestamps or even generic data of a particular use case, and (6) the ability to carry in-situ OAM data in various different transport protocols.

IOAM is also a network domain focused feature, where the network domain includes one or more network elements or entities within a single administration, for example as depicted in FIG. 1. In another example, a network domain can include an enterprise campus using physical connections between elements or an overlay network using virtual connections or tunnels for connectivity between elements. The network domain itself, as noted above, is defined by its perimeter or edge, where an operator of the domain includes provisions to ensure that the IOAM data stays within the specific domain.

As eluded to above, IOAM data is added to a packet upon entering the IOAM domain and is removed from the data packet when exiting the IOAM domain. IOAM data fields are added to or removed from traffic (i.e., data packets traversing the network) by the elements which form the edge of a domain (e.g., source edge router). Within the IOAM domain, the OAM data may be updated by network elements that the data packet traversed. As data packets traverse the network, tracing data is collected at every node. To optimize tracing, two separate options are employed: (1) pre-allocated trace option—which includes data fields with pre-allocated space for each network element to populate its information, and (2) incremental trace option—which includes data fields where each network element allocates and pushes its data immediately following the option header.

Turning to FIG. 2A, the figure depicts an example of an IOAM pre-allocated trace option header 202A. The header includes data fields including an IOAM Trace Type 204A, an Octets-left 206A, Flags 208A and Data Array 210A which contains Node Data List [0]-Node Data List [n]. The IOAM Trace Type is a sixteen (16) bit identifier which specifies the data types (or data items) used in the node data list [0]-[n]. Notably, bits 11-15 are undefined in the current format. The Octets-left 206A is an eight (8) bit data space that remain available for recording network element data. The Flags 208A is also an eight (8) bit field that defines several flags, including overflow and loopback flags. The data array 210A, which includes node data lists [0]-[n], is a variable length field, the type of which is determined by the IOAM Trace Type 204A representing the $n^{th}$ network element (node) data in the node data list.

With reference to FIG. 2B, the figure depicts an example of an IOAM incremental trace option header 202B. The header includes data fields including an IOAM Trace Type 204B, an Maximum length 206B, Flags 208B and Data Array 210B which contains Node Data List [0]-Node Data List [n]. Similar to the IOAM Trace Type in pre-allocated trace option header 202A. The IOAM incremental trace type option header 202B has a sixteen (16) bit identifier (IOAM Trace Type 204B) which specifies the data types (or data items) used in the node data list [0]-[n]. Again, bits 11-15 remain undefined. The Maximum length 206B is a field that is an eight (8) bit integer and specifies the maximum length of the node data list [n]. The Flags 208B is also an eight (8) bit field that defines several flags, including overflow and loopback flags. The data array 210B, which includes node data lists [0]-[n], is a variable length field, the type of which is determined by the IOAM Trace Type 204A representing the $n^{th}$ network element (node) data in the node data list.

Requirements for IOAM may be found in "Requirements for In-situ OAM draft-brockners-inband-oam-requirements-03," Network Working Group, Internet-Draft, Sep. 14, 2017, and data fields for In-situ OAM may be found in "Data Fields for In-situ OAM draft-brockners-inband-oam-data-04," ippm, Internet Draft, Sep. 30, 2017, the contents of which are hereby incorporated by reference.

Figure 3A:
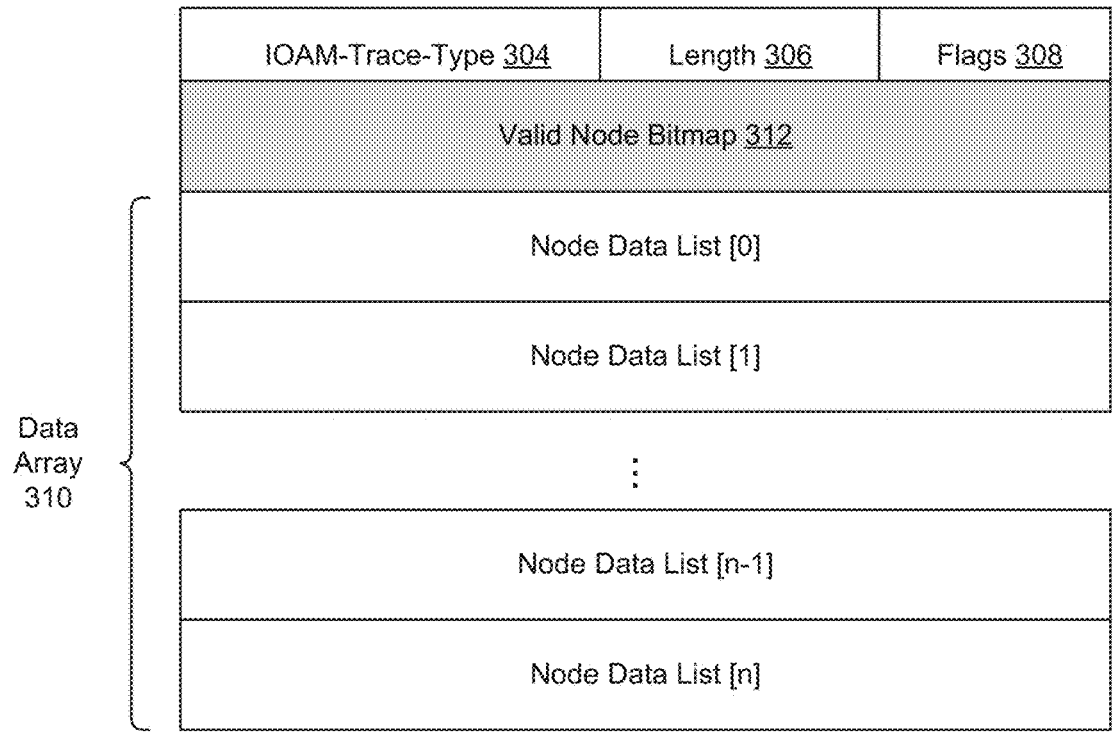
FIGS. 3A and 3B illustrate an example OAM header with a valid node bitmap field.
Figure 3B:
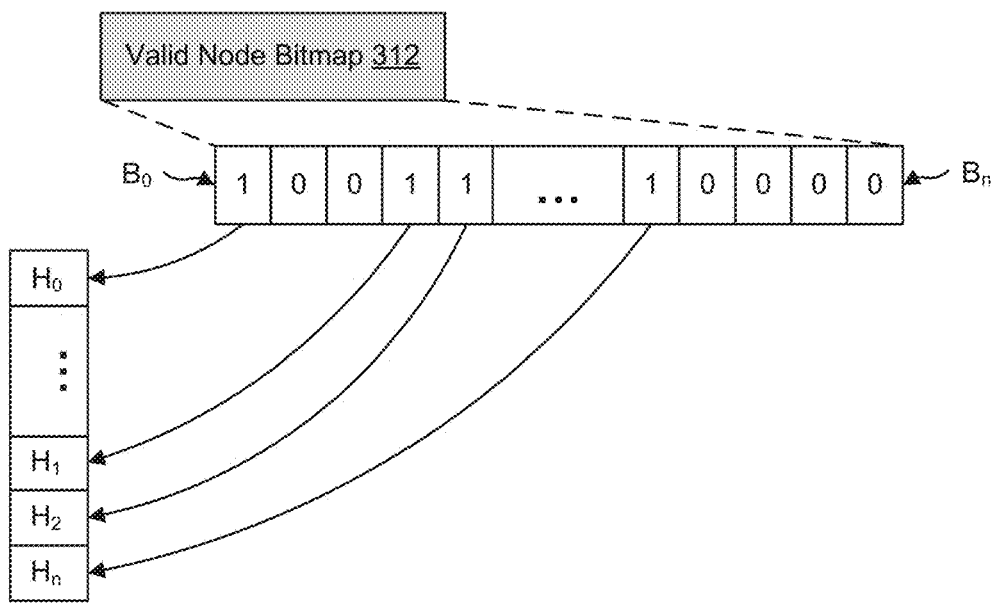

FIGS. 3A and 3B illustrate an example OAM header with a valid node bitmap field. In conventional OAM domains, the source edge node inserts the OAM header into each data packet received. Processing data in every data packet at each node in the domain often causes a heavy burden for nodes, particularly when calculations are necessary at the node (e.g., to determine transit delay). As traffic flow increases, nodes may not be able to handle the additional processing required for the OAM information inserted into the data packet. As a result, performance issues may occur, such as long latency and packet drop. Moreover, the large amount of data being collected may also burden destination entities, such as a management plane which collects and streams the data for analytics.

In one embodiment, to reduce the processing load of network nodes, the source edge node encapsulates (or inserts) the OAM header into a select number of the data packets traversing the OAM domain, as opposed to adding the IOAM header to all data packets. Adding OAM headers to the data packets in this manner reduces the overall IOAM data quantity and processing load of the network nodes as a subset of the data packets carries the OAM data.

In one instance, the number of data packets selected to encapsulate the OAM header is determined in a periodic manner. For example, every third data packet received at the source edge node will have an OAM header inserted into the data packet.

In another instance, a percentage of the data packets received at the source edge node have the OAH header inserted into the data packet. For example, thirty (30) percent of randomly selected data packets received at the source edge node will have the OAM header inserted therein. In this way, a subset of the data packets carry data in the OAM header.

Accordingly, as noted above, the overall OAM data quantity and the processing load of the network nodes is reduced. For example, following the periodic example above in which every third data packet has the OAM header inserted therein, the data quantity and processing load of the network nodes are reduced.

In another embodiment, different data packets may have different OAM headers inserted therein. For example, the source edge node maintains a different IOAM trace type 304 for different incoming data packets. The IOAM trace type 304, as explained, is a sixteen (16) bit identifier which specifies the data types (or items) used in a node data list [0]-[n]. Thus, the bits in the IOAM trace type 304 may be set different for different data packets such that different data requests are issued from the source edge node to different data packets. As a result, the network nodes handle fewer data items per data packet. It is appreciated that the above specified embodiments may be implemented separately or together.

In still another embodiment, a valid node bitmap 312 may be encapsulated or inserted into the IOAM header 302 at the source edge node. For example, the source edge node (or the head node), when inserting IOAM header 302, can decide which packet to choose and what IOAM trace type 304 should be inserted. Subsequently, each node on the data packet forwarding path can decide independently whether to insert any data in data packets having an IOAM header 302. If not, the corresponding bit in the valid node bitmap 312 can be set to '0'.

In one other embodiment, the source edge node may insert the IOAM header 302 into a data packet and set bits in the valid node bitmap 312 to '0'. When an intermediate node receives the data packet, the valid node bitmap 312 is checked to determine whether the bit corresponding to the intermediate node in the valid node bitmap 312 is set to '1' or '0'. If the bit in the valid node bitmap is set to '0' (which means the source edge node demands the intermediate node to not add any data to the data packet), the intermediate node will not add any data to the data packet. In one embodiment, the default value of each bit in the valid node bitmap 312 is set to '1' (e.g., the default is set such that each node on the data forwarding path adds data to the data packet).

It is appreciated that the disclosed embodiments of using a valid node bitmap 312 may be implemented separately or together in the same domain. It is also appreciated that implementation of the valid node bitmap 312 may be separate from or supplemental to the selection of periodic or probable data packets as discussed above.

The IOAM header 302 includes, for example, IOAM Trace Type 304, Length 306, Flags 308, Data Array 310 and Valid Node Bitmap 312 Each of the fields 304-310 in the IOAM header 302 are similar to those discussed above in the OAM headers of FIGS. 2A and 2B.

As an added measure of reducing the amount of data and processing load in the OAM domain, a valid node bitmap 312 is added as a new field to the IOAM header 302. The valid node bitmap 312 identifies nodes in the OAM domain that, although may be OAM-capable, will not add data to the data array 310 (node data list [0]-[n]) for various reasons, such as the node is too busy to handle the data request or a particular type of data being requested is not available at the node.

As illustrated, the newly defined valid node bitmap 312 in the IOAM header 302 is inserted prior to the data array 310 (i.e., prior to the node data lists [0]-[n]). Each bit $B_0$-$B_n$ in the valid node bitmap 312 represents a hop $H_0$-$H_n$ in the nodes of the OAM domain, where the node at a specific hop $H_0$-$H_n$ is capable of adding data to the node data list [0]-[n] of the IOAM header 302. In one embodiment, a hop $H_0$-$H_n$ is set to '1' when it is capable of adding data to the IOAM header 302. Otherwise, the bit is set to '0'.

For example, as shown in FIG. 3B, the valid node bitmap 312 has a number of valid bits (bits set to '1') equal to the number of hops for a particular forwarding path of a data packet in the OAM domain. Thus, as illustrated, each bit $B_0$-$B_n$ in the valid node bitmap 312 corresponds to a hop $H_0$-$H_n$ on the data packet's forwarding. Thus, the bits $B_0B_n$ in the valid node bitmap 312 are listed in an order of the hops on the data packet's forwarding path.

In one embodiment, bits $B_0$-$B_n$ in the valid node bitmap 312 are initially set to all zeroes (e.g., $B_0$-$B_n$='0'). If a specific hop $H_0$-$H_n$ is capable of adding data to a Node Data List [0]-[n], the corresponding bit $B_0$-$B_n$ in the node valid bitmap 312 is set to '1'. As explained above, by default, the source edge node may set all bits in valid node bitmap 312 to '1'. However, the source edge node may also set bits to '0' for a variety of reasons, such as to reduce the node loads. For example, assume for purposes of discussion that there are four (4) hops on the forwarding datapath (i.e., the valid node bitmap 312 has 4 bits). For the odd numbered data packets, the source edge node may set the valid node bitmap 312 to '1010'. For the even numbered packets, the source edge node may set the valid node bitmap 312 to '0101'. Accordingly, each node will add data to the data packet for every other data packet and the load is reduced by half. This technique may also be applied to the valid data bitmap 406 (FIG. 4) by adding the IOAM header 304 for every other packet and setting the valid data bitmap 406 is to '1111'.

In one embodiment, the bit location for a hop $H_0$-$H_n$ can be calculated from the length 306 field. In another embodiment, the valid node data items in the node data list is equal to the number of 1's in the Node Valid Bitmap. That is, for each bit $B_0$-$B_n$ in the valid node bitmap 312 set to '1', there is a corresponding node data list. For example, if five (5) bits are set to '1' (e.g., bits $B_0$-$B_4$ are set to '1'), there will be five (5) node data lists [0]-[4] in the data array 310.

It is appreciated that determination of hops on a forwarding path may be calculated according to well-known mechanisms and is not discussed as part of this disclosure.

Figure 4:
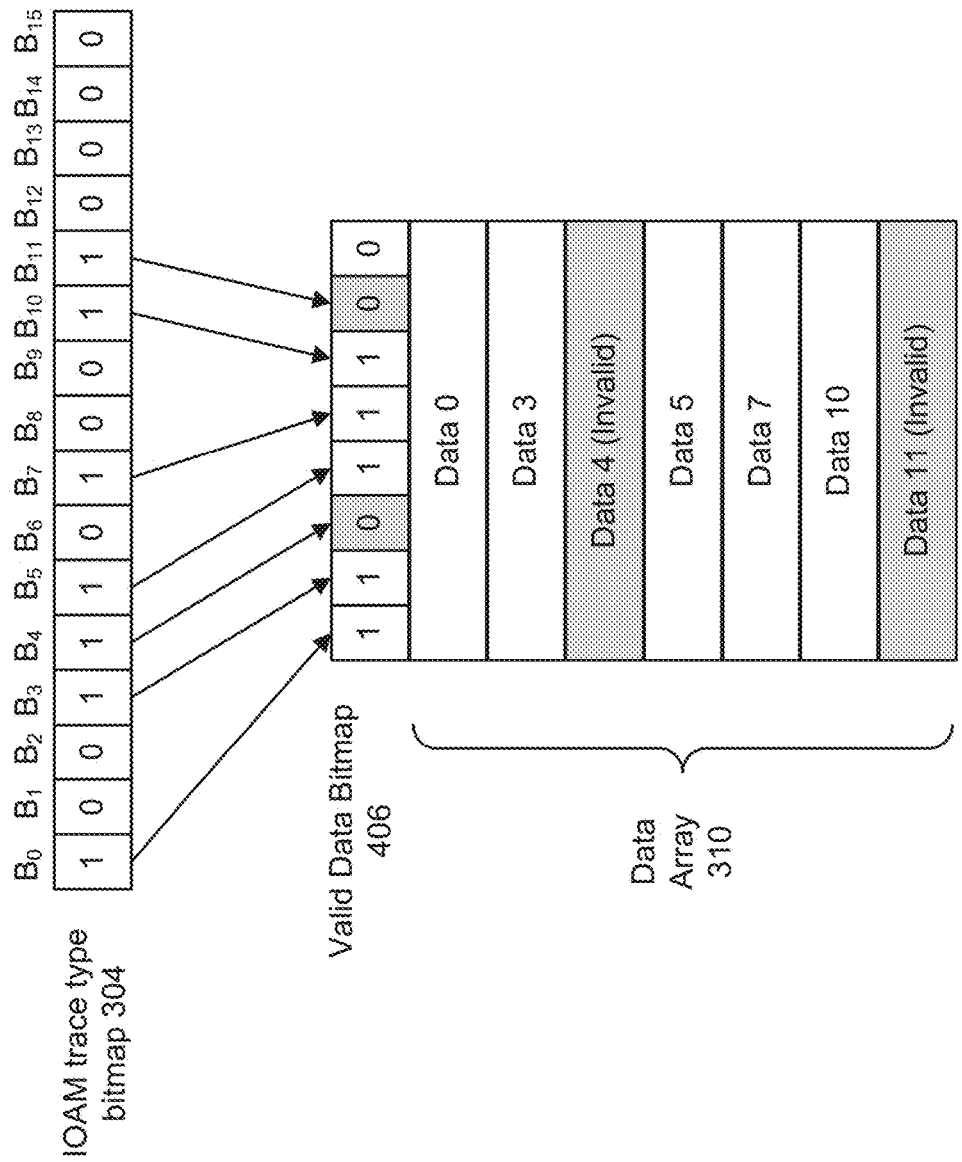
FIG. 4 illustrates an example valid data bitmap in accordance with various embodiments.

FIG. 4 illustrates an example valid data bitmap in accordance with various embodiments. The valid data bitmap 406, similar to the valid node bitmap 312, provides another mechanism by which to prevent specific data items from being collected from a node in the forwarding data path. As explained further below, a valid data bitmap 406 can be attached to each node data that forms the node data lists [0]-[n]. When the bit in the valid data bitmap 406 is set (e.g. set to '1'), the corresponding data is valid in the node. Otherwise, the corresponding data is invalid such that any entity processing collected data, such as the management plane, should ignore the data after collection.

For data collected at each node, there is a valid data bitmap 406 that identifies that different types of data that the node has available. When data is collected at a particular node (e.g., node x), the valid data bitmap 406 is added prior to the data array 310, as illustrated. The number of bits in the valid data bitmap 406 is equal to the number of bits set to '1' in the IOAM trace type bitmap 304 (excluding the next trace type bitmap indicator bits). When a bit is set to '1', the corresponding data is in the corresponding node is deemed valid. Otherwise, the data in the corresponding node is invalid such that data collected at the node may be later ignored by a processing entity, such as the management plane.

For example, as illustrated, the IOAM trace type 304 has sixteen (16) bits $B_0$-$B_{15}$, in which seven (7) bits are set to '1', where each of the bits identify a type of OAM data. In the illustrated example, the seven bits $B_0$, $B_3$, $B_4$, $B_5$, $B_7$, $B_{10}$ and $B_{11}$ are each set to '1' and therefore include data types to be collected at each node in the OAM domain. However, any particular node x in the OAM domain may not be able to provide all seven requested types of data as identified in the IOAM trace type bitmap 304. For example, a particular node x may only have five (5) types of data available, such as data types identified by bits $B_0$, $B_3$, $B_5$, $B_7$ and $B_{10}$. In order to make this distinction, the valid data bitmap 406, which has seven bits (the number of bits set to '1' in the IOAM trace type bitmap 304), is modified to set bits $B_4$ and $B_{11}$ to zero ('0'). Accordingly, the corresponding data fields in the node data array are also invalid.

In one embodiment, the size of the valid data bitmap 406 can be padded to two or four bytes to allow up to 16 or 32 types of data to be included in a node. In the example of valid data bitmap 406, an extra bit is added to generate an eight (8) bit data bitmap.

The following examples provide an explanation of the usefulness of IOAM sampling and data validation features as described herein. In a first example, an application needs to track a data packet's forwarding path and has the knowledge that the path will not change frequently. In this case, a low sampling rate may be set to periodically insert the IOAM header 302 to request the node ID. In a second example, and in a heterogeneous data plane, some nodes in the OAM domain support data x, whereas other nodes do not. In this case, an application interested in collecting data x may configure the IOAM header 302 to ask for data x. Nodes that cannot provide the data x are invalidated by resetting the corresponding bit in the valid data bitmap to '0'. Finally, in a third example, a multiple sampling rate and multiple data request schema can be defined for a forwarding path based on various application requirements and the data property. Thus, for a data packet, there can be no IOAM header 302 or different IOAM headers with different trace type bitmaps 304 or valid node bitmaps 312. The node does not need to process all data all the time. Rather, the node may process and collect data if a received data packet has an IOAM header 302 and the bit in the valid node bitmap 312 for the node is valid.

Figure 5:
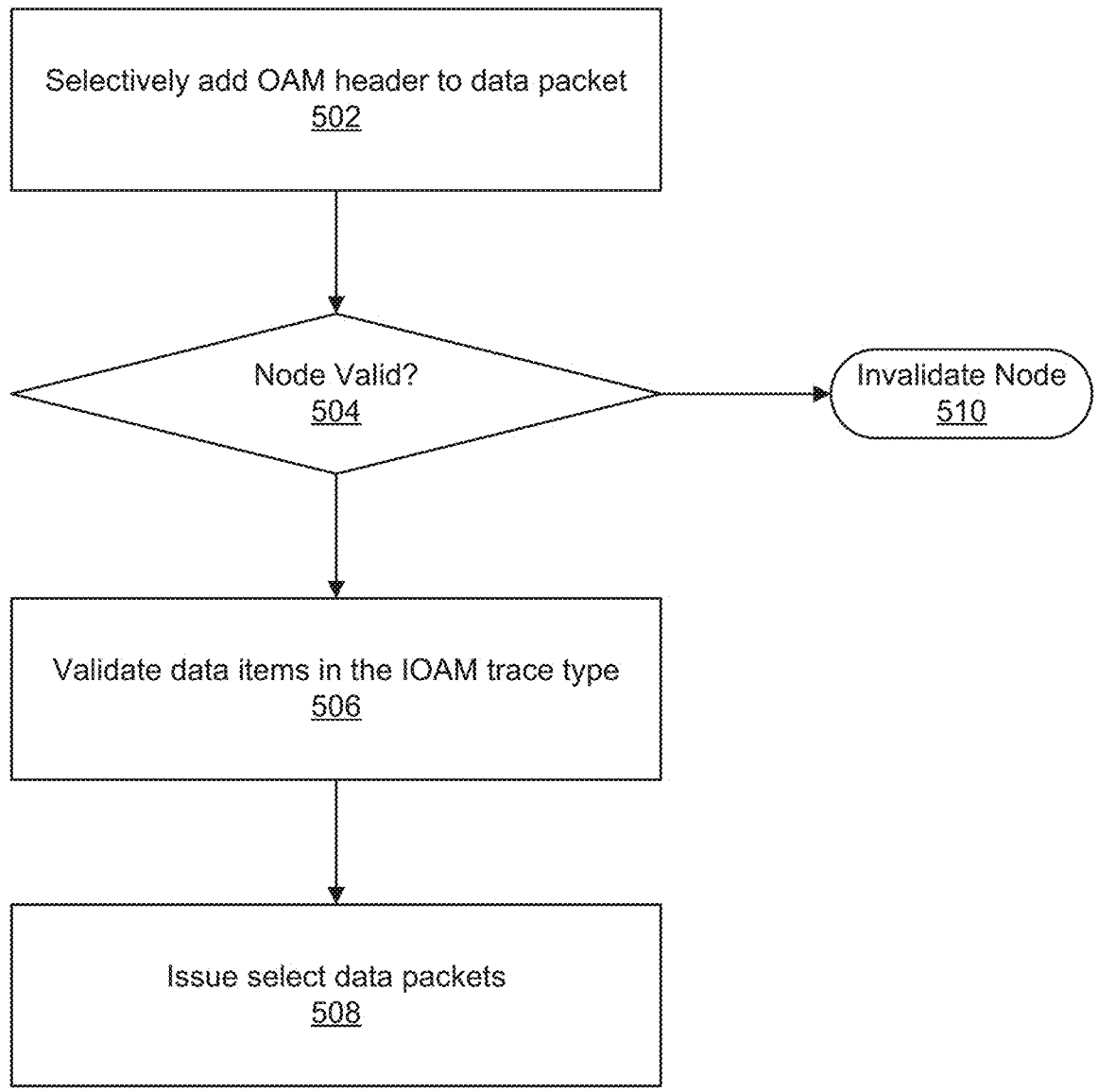
FIG. 5 illustrates a flow diagram in accordance with the disclosed embodiments.

FIG. 5 illustrates a flow diagram in accordance with the disclosed embodiments. In the description that follows, and for purposes of discussion, the process is implemented using a source edge node of the OAM domain. However, it is appreciated that the process is not limited to such source edge node and that any component described herein may implement the process.

As data packets arrive at a source edge node of an OAM domain, the source edge node modifies the incoming data packets by encapsulating an operations, administration and maintenance (OAM) header in a select number of the data packets, at 502. The OAM header 302 includes, but it not limited to, an IOAM trace type 304 (or data type bitmap), a valid node bitmap 312 and a data array 310 including a node list [0]-[n].

At 504, the valid node bitmap 312 inserted into the OAM header 302 by the source edge node identifies nodes in the OAM domain that add data to the OAM header 302. Nodes in the OAM domain that add data are identified by setting a corresponding bit in the valid node bitmap to valid 312 (e.g., '1'), and nodes in the OAM domain that do not add data are identified by setting a corresponding bit in the valid node bitmap 312 to invalid (e.g. '0'). If a node is determined to be invalid based on the corresponding bit of the valid node bitmap 312, the node is invalidated (the node is determined to not add any data) at 510. If a node is determined to be valid based on the corresponding bit of the valid node bitmap 312, the node is validated (the node is determined to add data) and the process proceeds to 506.

At 506, the data items in the IOAM trace type 304 are validated by adding a valid data bitmap 406 into the OAM header 302 by the source edge node for each of the one or more nodes identified as adding data to the OAM header 302, as illustrated in FIG. 4. Upon completion of validation, the valid data bitmap 406 indicates the types of data items available at each particular node, such that processing of data will occur for nodes that have validated the data.

At 508, the source edge node issues the select data packets to the one or more nodes identified in the OAM header 302.

Figure 6:
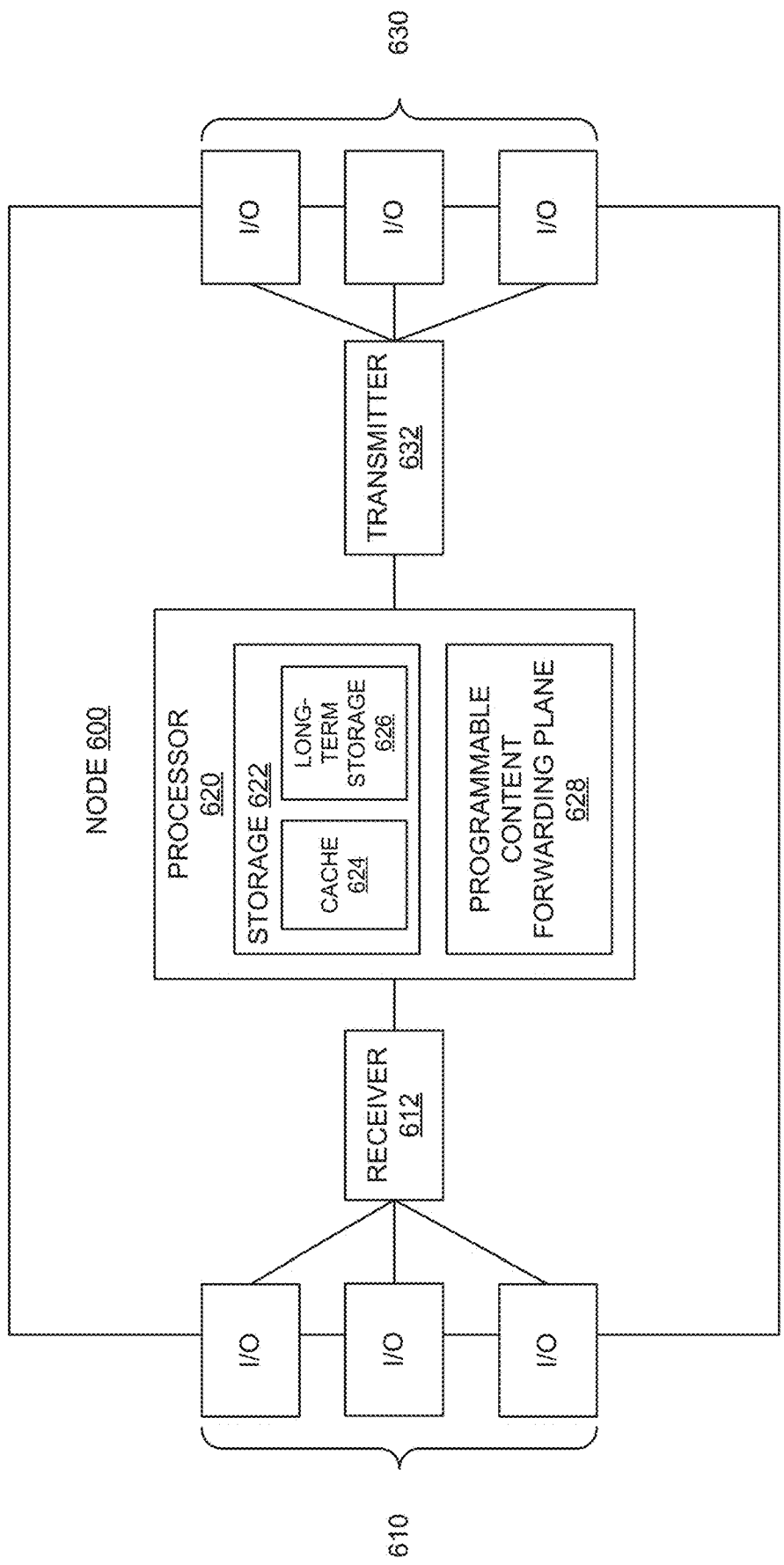
FIG. 6 illustrates an embodiment of a router in accordance with embodiments of the disclosure

FIG. 6 illustrates an embodiment of a router in accordance with embodiments of the disclosure. The node (e.g., a router) 600 may be, for example, a network element in (FIG. 1) or any other network element or node as described above. The node 600 may comprise a plurality of input/output ports 610/630 and/or receivers (Rx) 612 and transmitters (Tx) 632 for receiving and transmitting data from other nodes, a processor 620 (or content aware unit), including a storage 622 and programmable content forwarding plane 628, to process data and determine which node to send the data. The node 600 may also receive Interest messages and Data messages as described above. Although illustrated as a single processor, the processor 620 is not so limited and may comprise multiple processors. The processor 620 may be implemented as one or more central processing unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 620 may be configured to implement any of the schemes described herein, such as the processes illustrated in FIG. 5 using any one or combination of steps described in the embodiments. Moreover, the processor 620 may be implemented using hardware, software, or both.

The storage 622 (or memory) may include cache 624 and long-term storage 626, and may be configured to store routing tables, forwarding tables, or other tables or information disclosed herein. Although illustrated as a single storage, storage 622 may be implemented as a combination of read only memory (ROM), random access memory (RAM), or secondary storage (e.g., one or more disk drives or tape drives used for non-volatile storage of data).

The programmable content forwarding plane 628 may be configured to implement content forwarding and processing functions, such as at an application layer or L3, where the content may be forwarded based on content name or prefix and possibly other content related information that maps the content to network traffic. Such mapping information may be maintained in one or more content tables (e.g., CS, PIT, FIB) at the processor 620. The programmable content forwarding plane 628 may interpret user requests for content and accordingly fetch content, e.g., based on meta-data and/or content name (prefix), from the network or other content routers and may store the content, e.g., temporarily, in storage 622. The programmable content forwarding plane 628 may then forward the cached content to the user. The programmable content forwarding plane 1828 may be implemented using software, hardware, or both and may operate above the IP layer or L2.

Figure 7:
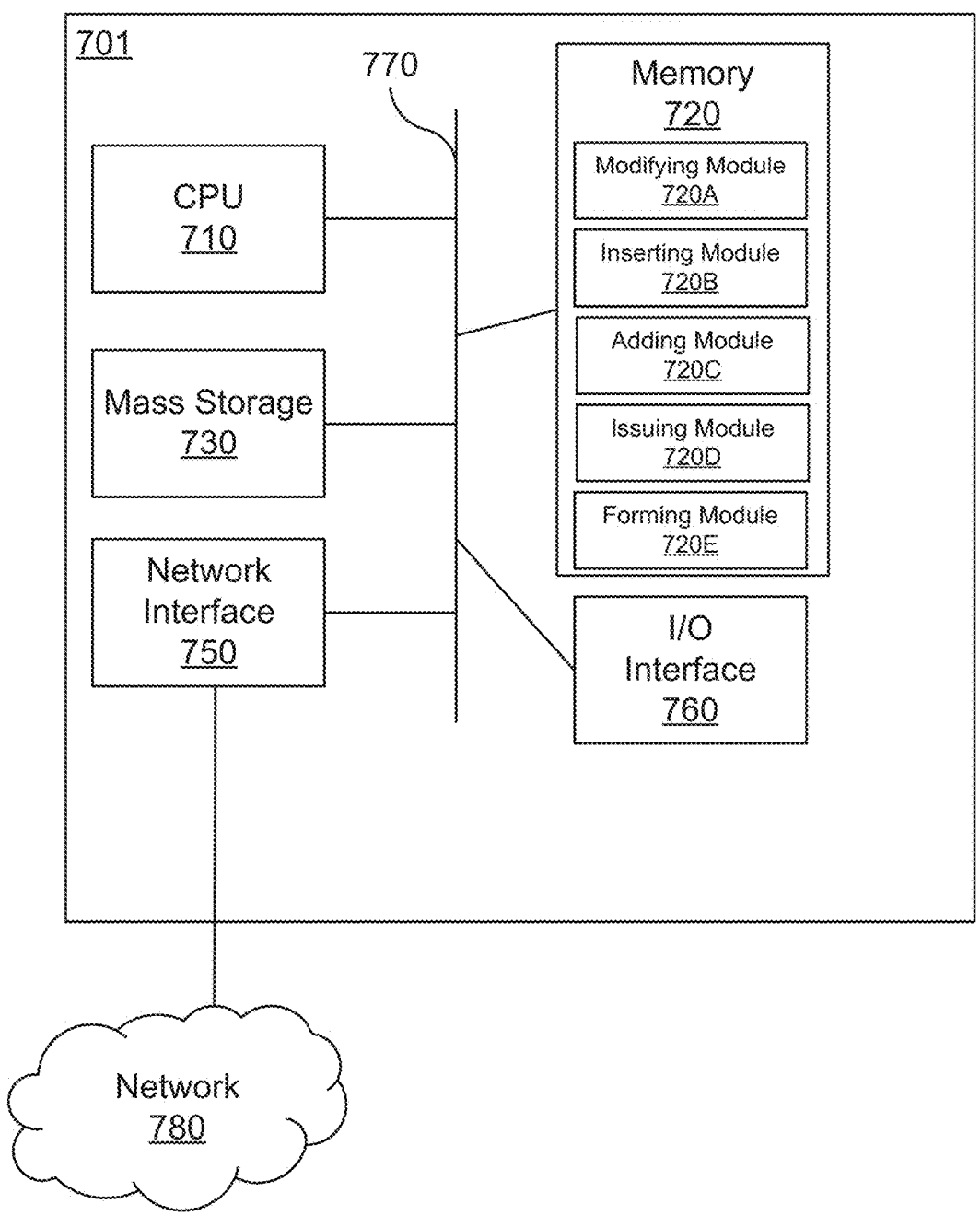
FIG. 7 illustrates a block diagram of a network system that can be used to implement various embodiments.

FIG. 7 is a block diagram of a network device 700 that can be used to implement various embodiments. Specific network devices may utilize all of the components shown, or only a subset of the components, and levels of integration may vary from device to device. Furthermore, the network device 700 may contain multiple instances of a component, such as multiple processing units, processors, memories, transmitters, receivers, etc. The network device 700 may comprise a processing unit 701 equipped with one or more input/output devices, such as network interfaces, storage interfaces, and the like. The processing unit 701 may include a central processing unit (CPU) 710, a memory 720, a mass storage device 730, and an I/O interface 760 connected to a bus 770. The bus 770 may be one or more of any type of several bus architectures including a memory bus or memory controller, a peripheral bus or the like.

The CPU 710 may comprise any type of electronic data processor. The memory 720 may comprise any type of system memory such as static random access memory (SRAM), dynamic random access memory (DRAM), synchronous DRAM (SDRAM), read-only memory (ROM), a combination thereof, or the like. In an embodiment, the memory 720 may include ROM for use at boot-up, and DRAM for program and data storage for use while executing programs. In embodiments, the memory 720 is non-transitory. In one embodiment, the memory 720 includes a modifying module 720A modifying data packets by encapsulating an OAM header in a select number of the data packets, an inserting module 720B inserting a valid node bitmap into the OAM header, an adding module 720C adding a valid data bitmap into the OAM header, an issuing module 720D the select data packets to the one or more nodes identified in the OAM header, and a forming module 720E forming a data array.

The mass storage device 730 may comprise any type of storage device configured to store data, programs, and other information and to make the data, programs, and other information accessible via the bus 770. The mass storage device 730 may comprise, for example, one or more of a solid state drive, hard disk drive, a magnetic disk drive, an optical disk drive, or the like.

The processing unit 701 also includes one or more network interfaces 750, which may comprise wired links, such as an Ethernet cable or the like, and/or wireless links to access nodes or one or more networks 780. The network interface 750 allows the processing unit 701 to communicate with remote units via the networks 780. For example, the network interface 750 may provide wireless communication via one or more transmitters/transmit antennas and one or more receivers/receive antennas. In an embodiment, the processing unit 701 is coupled to a local-area network or a wide-area network for data processing and communications with remote devices, such as other processing units, the Internet, remote storage facilities, or the like.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Computer-readable storage media (medium) exclude (excludes) propagated signals per se, can be accessed by a computer and/or processor(s), and include volatile and non-volatile internal and/or external media that is removable and/or non-removable. For the computer, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method of sending network management information in a network, comprising:
    modifying, by a source edge node, data packets by encapsulating an operations, administration and maintenance (OAM) header in a select number of the data packets, wherein the OAM header includes a data type bitmap;
    inserting a valid node bitmap into the OAM header, by the source edge node, wherein each bit in the valid node bitmap identifies whether one or more nodes in the network add data to the OAM header;
    adding a valid data bitmap into the OAM header, by the source edge node, for each of the one or more nodes identified as adding data to the OAM header, wherein the valid data bitmap indicates types of data items available at the node; and
    issuing, by the source edge node, the select data packets to the one or more nodes identified in the OAM header.

2. The method of claim 1, wherein the number of the data packets are selected periodically.

3. The method of claim 1, wherein a percentage of the number of data packets are selected randomly.

4. The method of claim 1, wherein each bit in the valid data bitmap corresponds to a valid bit in the data type bitmap.

5. The method of claim 4, wherein the OAM header includes one or more data node lists and the valid data bitmap is inserted before node data in a corresponding one of the data node lists.

6. The method of claim 5, wherein a number of bits in the valid data bitmap is equal to a number of types of data in the data type bitmap.

7. The method of claim 5, further comprising forming a data array including the one or more node data lists each corresponding to a valid bit in the valid data bitmap.

8. The method of claim 1, wherein the data type bitmap defines the types of data to be collected at the one or more nodes in the network.

9. The method of claim 1, wherein each bit in the valid node bitmap corresponds to a hop on a data packet forwarding path of the network and is listed in an order of the hops on the data packet forwarding path.

10. The method of claim 1, wherein the OAM header includes one or more node data lists and the valid node bitmap is inserted into the OAM header before the one or more node data lists.

11. A node sending network management information in a network, comprising:
    a non-transitory memory storage comprising instructions; and
    one or more processors in communication with the memory, wherein the one or more processors execute the instructions to:
        modify data packets by encapsulating an operations, administration and maintenance (OAM) header in a select number of the data packets, wherein the OAM header includes a data type bitmap;
        insert a valid node bitmap into the OAM header, wherein each bit in the valid node bitmap identifies whether one or more nodes in the network add data to the OAM header;
        adding a valid data bitmap into the OAM header for each of the one or more nodes identified as adding data to the OAM header, wherein the valid data bitmap indicates types of data items available at the node; and
        issue the select data packets to the one or more nodes identified in the OAM header.

12. The node of claim 11, wherein each bit in the valid data bitmap corresponds to a valid bit in the data type bitmap.

13. The node of claim 11, wherein the OAM header includes one or more data node lists and the valid data bitmap is inserted before node data in a corresponding one of the data node lists.

14. The node of claim 11, wherein the data type bitmap defines the types of data to be collected at the one or more nodes in the network.

15. The node of claim 11, wherein each bit in the valid node bitmap corresponds to a hop on a data packet forwarding path of the network and is listed in an order of the hops on the data packet forwarding path.

16. The node of claim 11, wherein the OAM header includes one or more node data lists and the valid node bitmap is inserted into the OAM header before the one or more node data lists.

17. A non-transitory computer-readable medium storing computer instructions for sending network management information in a network, that when executed by one or more processors, cause the one or more processors to perform the steps of:

modifying, by a source edge node, data packets by encapsulating an operations, administration and maintenance (OAM) header in a select number of the data packets, wherein the OAM header includes a data type bitmap;

inserting a valid node bitmap into the OAM header, by the source edge node, wherein each bit in the valid node bitmap identifies whether one or more nodes in the network add data to the OAM header;

adding a valid data bitmap into the OAM header, by the source edge node, for each of the one or more nodes identified as adding data to the OAM header, wherein the valid data bitmap indicates types of data items available at the node; and issuing, by the source edge node, the select data packets to the one or more nodes identified in the OAM header.

18. The non-transitory computer-readable medium of claim 17, wherein the OAM header includes one or more data node lists and the valid data bitmap is inserted before node data in a corresponding one of the data node lists.

19. The non-transitory computer-readable medium of claim 17, wherein each bit in the valid node bitmap corresponds to a hop on a data packet forwarding path of the network and is listed in an order of the hops on the data packet forwarding path.

20. The non-transitory computer-readable medium of claim 17, wherein the OAM header includes one or more node data lists and the valid node bitmap is inserted into the OAM header before the one or more node data lists.

* * * * *